(12) United States Patent
Yan et al.

(10) Patent No.: US 11,393,341 B2
(45) Date of Patent: Jul. 19, 2022

(54) JOINT ORDER DISPATCHING AND FLEET MANAGEMENT FOR ONLINE RIDE-SHARING PLATFORMS

(71) Applicant: Beijing DiDi Infinity Technology and Development Co., Ltd., Beijing (CN)

(72) Inventors: Jiao Yan, Sunnyvale, CA (US); Zhiwei Qin, San Jose, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 276 days.

(21) Appl. No.: 16/720,676

(22) Filed: Dec. 19, 2019

(65) Prior Publication Data

US 2020/0273347 A1 Aug. 27, 2020

Related U.S. Application Data

(60) Provisional application No. 62/810,860, filed on Feb. 26, 2019.

(51) Int. Cl.
*G08G 1/00* (2006.01)
*G06N 20/00* (2019.01)
(Continued)

(52) U.S. Cl.
CPC ............. *G08G 1/202* (2013.01); *G06N 20/00* (2019.01); *G06N 20/20* (2019.01); *G06Q 10/02* (2013.01);
(Continued)

(58) Field of Classification Search
CPC ........ G08G 1/202; G06N 20/20; G06N 20/00; G06Q 10/02; G06Q 10/047; G06Q 10/08355
See application file for complete search history.

(56) References Cited

U.S. PATENT DOCUMENTS 8,442,848 B2   5/2013  Myr
2002/0077876 A1   6/2002  O'Meara et al.
(Continued)

FOREIGN PATENT DOCUMENTS

WO   WO-2018125989 A2 *  7/2018 ............ H04L 67/10

OTHER PUBLICATIONS

Aamena Alshamsi et al., "Multiagent self-organization for a taxi dispatch system. In 8th international conference on autonomous agents and multiagent systems", 2009, pp. 21-28.
(Continued)

*Primary Examiner* — Michael D Lang
(74) *Attorney, Agent, or Firm* — Sheppard Mullin Richter & Hampton LLP

(57) ABSTRACT

Hierarchical multi-agent reinforcement learning may be used for joint order dispatching and fleet management for ride-sharing platforms. Information may be obtained. The information may include a status of a ride-sharing platform and a set of messages. The obtained information may be input into a trained hierarchical reinforcement learning (HRL) model. The trained HRL model may include at least one manager module corresponding to a region, and the at least one manager module may include a set of worker modules each corresponding to a division the region. At least one goal of the division in the region may be obtained based on the status of the ride-sharing platform and the set of messages. A vehicle action may be generated for each vehicle in the division in the region based on the status of the ride-sharing platform, the set of messages, and the at least one goal.

18 Claims, 9 Drawing Sheets

(51) Int. Cl.
G06Q 10/04 (2012.01)
G06Q 10/08 (2012.01)
G06N 20/20 (2019.01)
G06Q 10/02 (2012.01)

(52) U.S. Cl.
CPC ..... *G06Q 10/047* (2013.01); *G06Q 10/08355* (2013.01)

(56) References Cited

U.S. PATENT DOCUMENTS

| | | |
|---|---|---|
| 2011/0099040 A1 | 4/2011 | Felt et al. |
| 2011/0246246 A1 | 10/2011 | Johnson |
| 2012/0290652 A1 | 11/2012 | Boskovic |
| 2015/0081362 A1 | 3/2015 | Chadwick et al. |
| 2016/0026936 A1 | 1/2016 | Richardson et al. |
| 2016/0320195 A1 | 11/2016 | Liu et al. |
| 2016/0364678 A1 | 12/2016 | Cao |
| 2017/0091891 A1 | 3/2017 | Van Der Berg |
| 2017/0365030 A1 | 12/2017 | Shoham et al. |
| 2018/0376357 A1 | 12/2018 | Coutinho et al. |

OTHER PUBLICATIONS

Darse Billings et al., "Opponent Modeling in Poker", Aaai/iaai, 1998, pp. 493:499.
Lucian Busoniu et al., "Multi-agent reinforcement learning: A survey", In Control, Automation, Robotics and Vision, 2006. ICARCV'06. 9th International Conference on, IEEE, pp. 1-6.
Jakob Foerster et al., "Learning to communicate with deep multi-agent reinforcement learning", Advances in Neural Information Processing Systems, 2016, pp. 2137-2145.
Jakob N. Foerster et al., "Learning to communicate to solve riddles with deep distributed recurrent q-networks", arXiv preprint arXiv:1602.02672, 2016.
Jayesh K. Gupta et al., "Cooperative multi-agent control using deep reinforcement learning", International Conference on Autonomous Agents and Multiagent Systems, Springer, 2017, pp. 66-83.
Matthew John Hausknecht, "Cooperation and communication in multiagent deep reinforcement learning", PhD thesis, 2016.
Junling Hu et al., "Multiagent reinforcement learning: theoretical framework and an algorithm", ICML, vol. 98, Citeseer, 1998, pp. 242-250.
Der-Horng Lee et al., "Taxi dispatch system based on current demands and real-time traffic conditions", Transportation Research Record: Journal of the Transportation Research Board, (1882):193-200, 2004.
Bin Li et al., "Hunting or waiting? discovering passenger-finding strategies from a large-scale real-world taxi dataset", Pervasive Computing and Communications Workshops (PERCOM Workshops), 2011 IEEE International Conference on, pp. 63-68. IEEE, 2011.
Kevin Frans et al., "Meta learning shared hierarchies", arXiv:1710.09767v1 [cs.LG] Oct. 26, 2017.
Minne Li et al., "Efficient ridesharing order dispatching with mean field multi-agent reinforcement learning", arXiv preprint arXiv:1901.11454, 2019.
Ziqi Liao, "Taxi dispatching via global positioning systems". IEEE Transactions on Engineering Management, 48(3):342-347, 2001.
Ziqi Liao, "Real-time taxi dispatching using global positioning systems", Communications of the ACM, 46(5):81-83, 2003.
Kaixiang Lin et al., "Efficient large-scale fleet management via multi-agent deep reinforcement learning", arXiv preprint arXiv:1802.06444, 2018.
Ryan Lowe et al., "Multi-agent actor-critic for mixed cooperative-competitive environments", Advances in Neural Information Processing Systems, 2017, pp. 6379-6390.
Gary S. Lynch, "Single point of failure: The 10 essential laws of supply chain risk management", John Wiley & Sons, 2009.
Fei Miao et al., "Taxi dispatch with real-time sensing data in metropolitan areas: A receding horizon control approach", IEEE Transactions on Automation Science and Engineering, 13(2):463-478, 2016.
Volodymyr Mnih et al., "Human-level control through deep reinforcement learning", Nature, 518(7540):529, 2015.
Igor Mordatch et al., "Emergence of grounded compositional language in multi-agent populations", arXiv preprint arXiv:1703.04908, 2017.
James Munkres, "Algorithms for the assignment and transportation problems", Journal of the society for industrial and applied mathematics, 5(1):32-38, 1957.
Takuma Oda et al., "Distributed fleet control with maximum entropy deep reinforcement learning", 2018.
Christos H. Papadimilriou et al., "Combinatorial optimization: algorithms and complexity", Courier Corporation, 1998.
Frederik Schadd et al., "Opponent modeling in real-time strategy games", GAMEON, 2007, pp. 61-70.
Kiam Tian Seow et al., "A collaborative multiagent taxi-dispatch system", IEEE Transactions on Automation Science and Engineering, 7(3):607-616, 2010.
Lloyd S. Shapley, "Stochastic games", Proceedings of the National Academy of Sciences, 39(10):1095-1100, 1953.
Matthijs TJ Spaan, "Partially observable markov decision processes", In Reinforcement Learning, Springer, 2012, pp. 387-414.
Sainbayar Sukhbaatar et al., "Learning multiagent communication with backpropagation", Advances in Neural Information Processing Systems, 2016, pp. 2244-2252.
Gerald Tesauro, "Extending Q-learning to General Adaptive Multi-agent Systems", Advances in Neural Information Processing Systems, 2004, pp. 871-878.
Yongxin Tong et al., "A unified approach to route planning for shared mobility", Proceedings of the VLDB Endowment, 11(11):1633-1646, 2018.
Hado Van Hasselt et al., "Deep reinforcement learning with double q-learning", AAAI, vol. 2, Phoenix, AZ, 2016, p. 5.
Zhaodong Wang et al., "Deep reinforcement learning with knowledge transfer for online rides order dispatching", 2018 IEEE International Conference on Data Mining (ICDM), pp. 617-626. IEEE, 2018.
Zheng Wang et al., "Learning to estimate the travel time", Proceedings of the 24th ACM SIGKDD International Conference on Knowledge Discovery & Data Mining, pp. 858-866. ACM, 2018.
Chong Wei et al., "Look-ahead insertion policy for a shared-taxi system based on reinforcement learning", IEEE Access, 6:5716-5726, 2018.
Zhe Xu et al., "Large-scale order dispatch in on-demand ride-hailing platforms: A learning and planning approach", Proceedings of the 24th ACM SIGKDD International Conference on Knowledge Discovery & Data Mining, ACM, 2018, pp. 905-913.
Yaodong Yang et al., "Mean field multi-agent reinforcement learning", arXiv preprint arXiv:1802.05438, 2018.
Lingyu Zhang et al., "A taxi order dispatch model based on combinatorial optimization", Proceedings of the 23rd ACM SIGKDD International Conference on Knowledge Discovery and Data Mining, pp. 2151-2159. ACM, 2017.
Lianmin Zheng et al., "Magent: A many-agent reinforcement learning platform for artificial collective intelligence", NIPS Demo, 2017.
Niels Agatz et al., "Optimization for dynamic ride-sharing: A review", European Journal of Operational Research, 223(2):295-303, 2012.
Christoph Stach, "Saving time, money and the environment-vhike a dynamic ride-sharing service for mobile devices", Pervasive Computing and Communications Workshops (PERCOM Workshops), 2011 IEEE International Conference on, pp. 352-355. IEEE, 2011.
Richard S. Sutton et al., "Reinforcement Learning: An Introduction", MIT Press, Second Edition, 2018.
Sanjeevan Ahilan et al., "Feudal multi-agent hierarchies for cooperative reinforcement learning", arXiv:1901.08492v1 [cs.MA], Jan. 24, 2019.
Pierre-Luc Bacon et al., "The option-critic architecture", AAAI, 2017, arXiv:1609.05140v2 [cs.AI] Dec. 3, 2016.

(56) References Cited

OTHER PUBLICATIONS

Richard Bellman, "Dynamic Programming", Courier Corporation, 2013.
Nuttapong Chentanez et al., "Intrinsically motivated reinforcement learning", NeurIPS, 2005.
Christian Daniel et al., "Hierarchical relative entropy policy search", Proceedings of the 15th International Conference on Artificial Intelligence and Statistics (AISTATS), Artificial Intelligence and Statistics, 2012, pp. 273-281.
Peter Dayan et al., "Feudal reinforcement learning", NeurIPS, 1993.
Thomas G. Diettrich, "Hierarchical reinforcement learning with the maxq value function decomposition", Journal ol Artificial Intelligence Research, vol. 13, 2000, pp. 227-303.
Carlos Florensa et al., "Stochastic neural networks for hierarchical reinforcement learning", arXiv:1704.03012v1 [cs.AI], Apr. 10, 2017.
PCT International Search Report and the Written Opinion dated May 22, 2020, issued in related International Application No. PCT/US2020/019414 (9 pages).
Caroline Claus et al. "The Dynamics of Reinforcement Learning in Cooperative Multiagent Systems", AAAI-98 Proceedings Dec. 31, 1998 (Dec. 31, 1998) [retrieved on Apr. 29, 2020].
Kaixiang Lin et al. "Efficient Large-Scale Fleet Management via Multi-Agent Deep Reinforcement Learning", KDD 2018, research track paper. Aug. 19-23, 2018 (Aug. 23, 2018) [retrieved on Apr. 29, 2020].
Ermo Wei et al. "Multiagent Soft Q-Learning", The 2018 AAAI Spring Symposium Series, 2018, pp. 351-357.
PCT International Search Report and the Written Opinion dated May 22, 2020, issued in related International Application No. PCT/US2020/019417 (7 pages).
Gianpaolo Ghiani et al., "Real-time vehicle routing: Solution concepts, algorithms and parallel computing strategies", European Journal of Operational Research, vol. 151, 2003, pp. 1-11.
Xiangyu Kong et al., "Revisiting the Master-Slave Architecture in Multi-Agent Deep Reinforcement Learning", arXiv:1712.07305v1, Dec. 20, 2017, pp. 1-14.
Tejas D. Kulkarni et al., "Hierarchical deep reinforcement learning: Integrating temporal abstraction and intrinsic motivation", arXiv:1604.06057v2 [cs.LG], May 31, 2016.
Timothy P. Lillicrap et al., "Continuous control with deep reinforcement learning", arXiv:1509.02971v6 [cs.LG], Jul. 5, 2019.
Dominique Lord et al., "Poisson, poisson-gamma and zero-inflated regression models of motor vehicle crashes: balancing statistical fit and theory", Accident Analysis & Prevention, 83rd Annual Meeting of Transportation Research Board, Apr. 21, 2004.
Volodymyr Mnih et al., "Playing atari with deep reinforcement learning", arXiv:1312.5602v1 [cs.LG], Dec. 19, 2013.
Ofir Nachum et al., "Data-efficient hierarchical reinforcement learning", arXiv:1805.08296v4 [cs.LG], Oct. 5, 2018.
Doina Precup, "Temporal abstraction in reinforcement learning", Dissertation submitted to the Graduate School of the University of Massachusetts Amherst, May 2000.
Martin Riedmiller, "Learning by playing-solving sparse reward tasks from scratch", arXiv:1802.10567v1 [cs.LG], Feb. 28, 2018.
Olivier Sigaud et al., "Policy search in continuous action domains: an overview", arXiv:1803.04706v5 [cs.LG], Jun. 13, 2019.
Hugo P. Simao et al., "An approximate dynamic programming algorithm for large-scale fleet management: A case application", Transportation Science, Articles in Advance, 2009, pp. 1-20.
Martin Stolle et al., "Learning Options in Reinforcement Learning", International Symposium on Abstraction, Reformulation, and Approximation, 2002.
Richard S. Sutton et al., "Between MDPs and semi-MDPs: A framework for temporal abstraction in reinforcement learning", Artificial Intelligence, vol. 112, 1999, pp. 181-211.
Chen Tessler et al., "A deep hierarchical approach to lifelong learning in minecraft", AAAI, 2017, arXiv:1604.07255v3 [cs.AI] Nov. 30, 2016.
Ashish Vaswani et al., "Attention is all you need", arXiv:1706.03762v5 [cs.CL], Dec. 6, 2017.
Petar Velickovic et al., "Graph Attention Networks", arXiv:1710.10903v3 [stat.ML], Feb. 4, 2018.
Alexander Sasha Vezhneveis et al. "FeUdal networks for hierarchical reinforcement learning", arXiv:1703.01161v2 (cs.AI] Mar. 6, 2017.
Xiangyu Zhao et al., "Deep reinforcement learning for list-wise recommendations", arXiv:1801.00209v3 [cs.LG] Jun. 27, 2019.
Qingnan Zou et al., "A novel taxi dispatch system for smart city", International Conference on Distributed, Ambient, and Pervasive Interactions, 2013.

\* cited by examiner

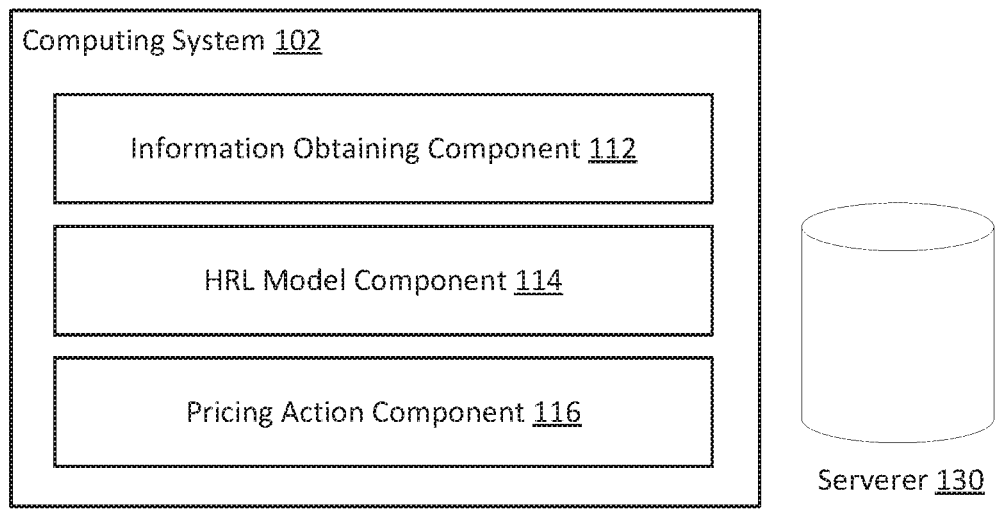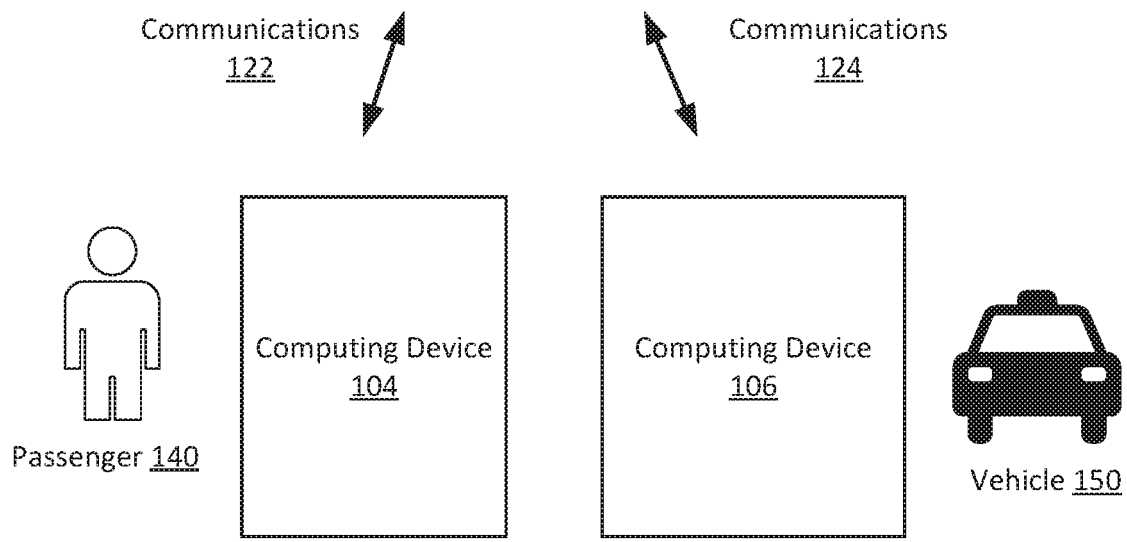
FIG. 1

600

602: Obtaining a status of a ride-sharing platform and a set of messages

604: Inputting the obtained information into a trained hierarchical reinforcement learning (HRL) model, wherein the trained HRL model comprises at least one manager module corresponding to a region, and wherein the at least one manager module comprises a set of worker modules each corresponding to a division in the region

606: Obtaining at least one goal of the division in the region based on the status of the ride-sharing platform and the set of messages

608: For each vehicle in the division in the region, generating a vehicle action based on the status of the ride-sharing platform, the set of messages, and the at least one goal

FIG. 6

JOINT ORDER DISPATCHING AND FLEET MANAGEMENT FOR ONLINE RIDE-SHARING PLATFORMS

CROSS REFERENCE TO RELATED APPLICATION

This application claims priority to U.S. Provisional Application No. 62/810,860, filed Feb. 26, 2019, and entitled "SYSTEM AND METHOD FOR RIDE ORDER DISPATCHING", which is incorporated herein by reference in its entirety.

TECHNICAL FIELD

The disclosure relates generally to a joint decision making task of order dispatching and fleet management in online ride-sharing platforms based on hierarchical multi-module reinforcement learning.

BACKGROUND

Online ride-sharing platforms may substantially transform daily life by sharing and reallocating transportation resources to promote transportation efficiency. The ride-sharing platforms may perform two decision making tasks. The first task may include order dispatching. Order dispatching may include matching orders from passengers with available vehicles (i.e., drivers) in real time to directly deliver the service. The second decision making task may include fleet management. Fleet management may include the repositioning of vehicles to certain areas in advance to prepare for the later order dispatching.

Interconnecting order dispatching and fleet management may present significant technical challenges, for example, when dealing with a large number of orders and vehicles. One approach is to model each available vehicle as an agent. However, for this approach, the platform must maintain thousands of agents interacting with the environment, resulting in a huge computational cost. A key challenge in seeking an optimal control policy is to find a trade-off between immediate and future rewards (e.g., accumulated driver income). Greedily matching vehicles with long-distance orders may receive a high immediate gain at a single order dispatching stage, but may harm order response rate (ORR). This problem may be more prominent during rush hour because the trips may have long drive times and end at unpopular destinations.

SUMMARY

Various embodiments of the specification include, but are not limited to, systems, methods, and non-transitory computer readable media for ride order-dispatching.

In various implementations, a method may include obtaining information. The obtained information may include a status of a ride-sharing platform and a set of messages. The method may further include inputting the obtained information into a trained hierarchical reinforcement learning (HRL) model. The trained HRL model may include at least one manager module corresponding to a region, and the at least one manager module may include a set of worker modules each corresponding to a division in the region. The method may further include obtaining at least one goal of the division in the region based on the status of the ride-sharing platform and the set of messages. The method may further include generating a set of vehicle actions for each vehicle in the division in the region based on the status of the ride-sharing platform, the set of messages, and the at least one goal.

In another aspect of the present disclosure, a computing system may comprise one or more processors and one or more non-transitory computer-readable memories coupled to the one or more processors and configured with instructions executable by the one or more processors. Executing the instructions may cause the system to perform operations. The operations may include obtaining information. The obtained information may include a status of a ride-sharing platform and a set of messages. The operations may further include inputting the obtained information into a trained hierarchical reinforcement learning (HRL) model. The trained HRL model may include at least one manager module corresponding to a region, and the at least one manager module may include a set of worker modules each corresponding to a division in the region. The operations may further include obtaining at least one goal of the division in the region based on the status of the ride-sharing platform and the set of messages. The operations may further include generating a set of vehicle actions for each vehicle in the division in the region based on the status of the ride-sharing platform, the set of messages, and the at least one goal.

Yet another aspect of the present disclosure is directed to a non-transitory computer-readable storage medium configured with instructions executable by one or more processors to cause the one or more processors to perform operations. The operations may include obtaining information. The obtained information may include a status of a ride-sharing platform and a set of messages. The operations may further include inputting the obtained information into a trained hierarchical reinforcement learning (HRL) model. The trained HRL model may include at least one manager module corresponding to a region, and the at least one manager module may include a set of worker modules each corresponding to a division in the region. The operations may further include obtaining at least one goal of the division in the region based on the status of the ride-sharing platform and the set of messages. The operations may further include generating a set of vehicle actions for each vehicle in the division in the region based on the status of the ride-sharing platform, the set of messages, and the at least one goal.

In some embodiments, the status of the ride-sharing platform may include a number of available vehicles in the division, a number of trip orders in the division, an entropy of the division, a number of vehicles in a fleet management group, and a distribution of orders in the division.

In some embodiments, the set of messages may include a set of manager-level messages for coordinating between at least a first manager module and a second manager module of the at least one manager module, and a set of worker-level messages for communicating between the set of worker modules.

In some embodiments, the division corresponding to each worker module in the set of worker modules may correspond to a grid cell in a grid-world representing a real world geographical area.

In some embodiments, the vehicle action may include order dispatching (OD) or fleet management (FM).

In some embodiments, the OD may include dispatching a corresponding vehicle to a passenger in the ride-sharing platform.

In some embodiments, the FM may include repositioning a corresponding vehicle to a different division or keeping the corresponding vehicle at the division.

In some embodiments, generating the vehicle action may include obtaining a set of feature weights for each worker agent in set of worker agents. The set of feature weights may be obtained based on the status of the ride-sharing platform, the set of messages, and the at least one goal. A set of ranking features may be obtained for a set of trip orders. A ranked list of candidate OD ride orders and candidate FM ride orders may be obtained based on the set of feature weights and the set of ranking features. A top vehicle action may be selected from the ranked list for each vehicle.

In some embodiments, the at least one manager module may receive an extrinsic reward in response to the vehicle action based on an accumulated driver income and an order response rate.

In some embodiments, each worker module in the set of worker modules may receive an intrinsic reward in response to the vehicle action based on a cosine similarity between the at least one goal and a change in the status of the ride-sharing platform over time.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 1 illustrates an exemplary system for joint ride-order dispatching and fleet management, in accordance with various embodiments.

FIG. 6 illustrates a flowchart of an example method for joint ride-order dispatching and fleet management, according to various embodiments of the present disclosure.

DETAILED DESCRIPTION

Figure 2A:
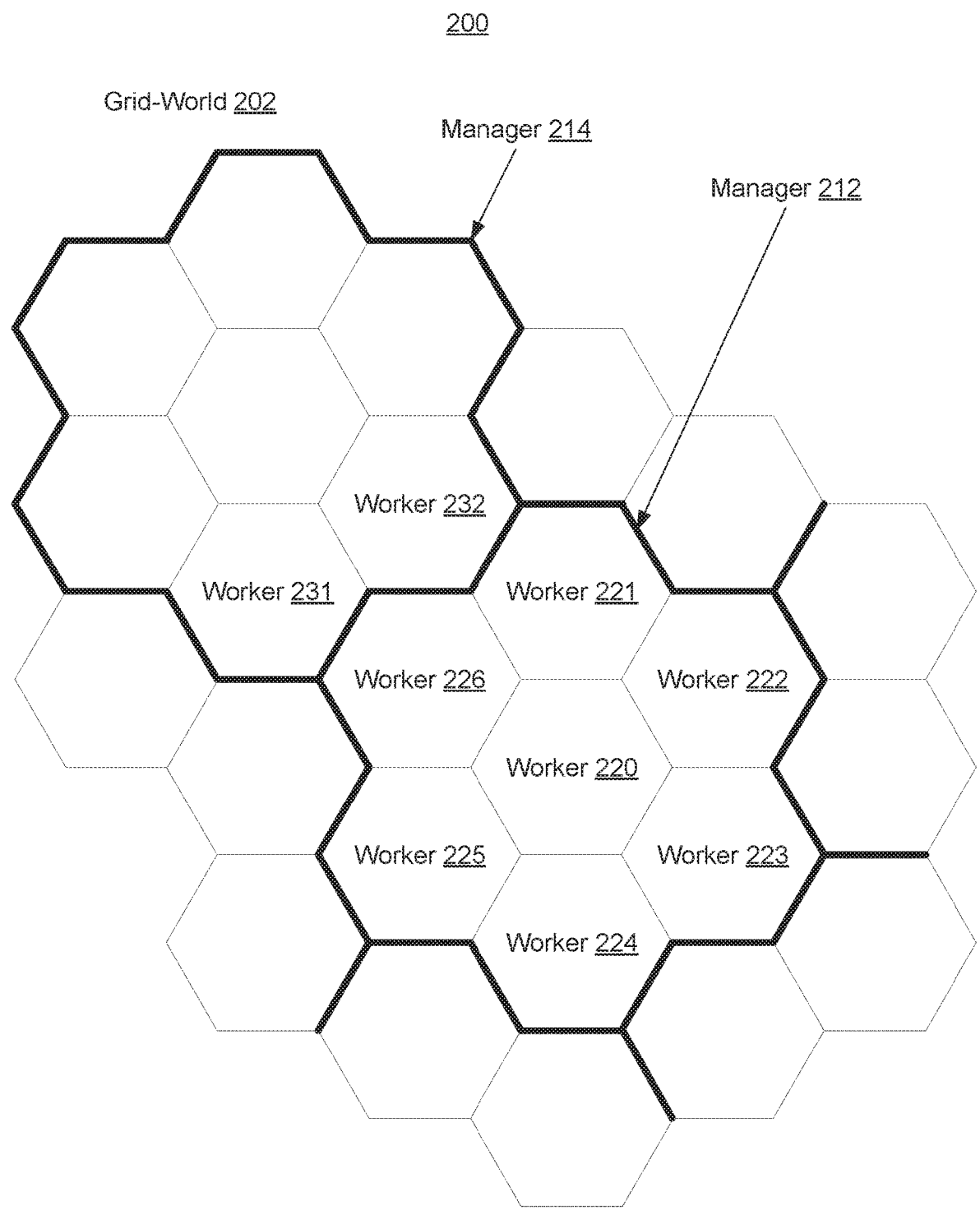
FIG. 2A illustrates exemplary diagram of a hexagonal grid world, in accordance with various embodiments.

Various embodiments will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope, and contemplation of the present invention as further defined in the appended claims.

The approaches disclosed herein may improve the functioning of multi-module hierarchical reinforcement learning (HRL) methods and computing systems for joint order dispatching and fleet management of a ride-sharing platform. A large-scale homogeneous set of vehicles may be controlled in online ride-sharing platforms by combining an order dispatching system with a fleet management system with the goal of maximizing the region-level accumulated driver income (ADI) and order response rate (ORR). Vehicles in online ride-sharing platforms may be divided into two groups: an order dispatching (OD) group and a fleet management (FM) group. For the OD group, the vehicles may be matched with available orders pair-wisely. For the FM group, the vehicles may be repositioned to new locations, or may be kept at the same location. Improving OD and FM decision making tasks may improve the overall efficiency of online ride-sharing platforms by allowing drivers to be positioned near both immediate and future orders.

The decision making tasks of matching order-vehicle pairs and repositioning vehicles may be performed so that the future locations of vehicles are nearby future orders. OD and FM may be modeled as a sequential decision making problem and the problem may be solved using reinforcement learning (RL). OD and FM may be highly correlated problems, especially for large-scale ride-sharing platforms in large cities. The problems may be solved jointly in order to improve performance.

In some embodiments, a region grid world may be utilized to reduce computational costs. Each region grid cell may be regarded as an agent, and a ride-sharing system may be modeled in a hierarchical learning setting. As a result, decentralized learning may be utilized and control may be achieved with distributed implementation. ADI may be increased by balancing immediate and future rewards. RL may be deployed to combine instant order reward from online planning with future state-value as the final matching value.

In some embodiments, HRL may be used to improve coordination between different regions. A geographical hierarchical structure of region agents may be used. Large districts (i.e., regions) may be treated as manager agents and small districts (i.e., divisions) may be treated as worker agent. Each manager agent may control a set of worker agents. The manager agents may operate at a lower spatial and temporal dimension and may set abstract goals which may be conveyed to worker agents. The worker agents may generate actions and may interact with an environment. The actions may be coordinated with manager-level goals and worker-level messages. This decoupled structure may facilitate long timescale credit assignments and may improve the balance between immediate and future revenue.

In some embodiments, the tasks of selecting orders may be modeled as RL actions. Traditional RL models require a fixed action space, however, there is no guarantee of a fixed action space for selecting orders as the available orders keep changing. A state-action value function may be learned to evaluate each valid order-vehicle match. Then, a combinatorial optimization method such as Kuhn-Munkres (KM) algorithm may be used to filter the matches. However, such a method faces the challenge that order dispatching and fleet management are different tasks, which results in heterogeneous action spaces. Heterogeneous action spaces may result in high computational costs.

In some embodiments, actions may be defined as weight vectors for ranking orders and fleet management. The fleet controls may be set as fake orders, and all the orders may be ranked and matched with vehicles in each agent. As a result, heterogeneous and variant action space, as well as high computational costs, may be avoided. Joint order dispatching and fleet management tasks may provide superior performance in terms of ADI and ORR.

Order dispatching and fleet management are two major decision making tasks for online ride-sharing platforms. To improve global performance, rule-based and combinatorial optimization techniques may be leveraged. Large amounts of available service data allows reinforcement learning algorithms to be effective in complicated traffic management problems. Learning and planning methods based on reinforcement learning may be used to optimize resource utilization and user experience in a global and more farsighted view. The performance of fleet management may be improved by leveraging the graph structure of a road network and expanded distributed deep Q-network (DQN) formulation to maximize entropy in the agents' learning policy with soft Q-learning. Reinforcement learning may take the uncertainty of future requests into account and may make a look-ahead decision to help an operator improve the global level-of-service of a shared-vehicle system through fleet management. A contextual multi-agent actor-critic framework may be used to captured the complicated stochastic demand-supply variations in high-dimensional space. Explicit coordination may be achieved among a large number of agents adaptive to different contexts in fleet management system. Joint modeling of order dispatching and fleet management may be used to improve online ride-sharing platforms.

HRL may be used to extend traditional RL methods in order to solve tasks with long-term dependency or multi-level interaction patterns. A multi-level hierarchical policy may be trained in a multi-task setup and a hierarchical setting may be implemented in a sparse reward problem. An options framework may be used to formulate the problem with a two level hierarchy, where the lower-level is a sub-policy with a termination condition. Traditional options frameworks suffer from prior knowledge on designing options. A high-level policy may be jointly learned with a low-level policy. However, this actor-critic HRL approach must either learn a sub-policy for each time step or one policy for the whole episode. Therefore, the performance of the whole module is often dependent on learning useful sub-policies. To guarantee that effective sub-policies are generated, auxiliary rewards (e.g., hand-designed rewards based on prior domain knowledge or mutual information) may be provided for low-level policies. However, it is often costly to obtain one well-designed and suitable reward. FeUdal Networks (FuN) may utilize generic rewards for low-level policy learning in order to avoid the cost of designing hand-crafted rewards. FuN are derived from feudal RL, which may include a model designed to achieve goals and receive a parameterized lower-level reward. In FuN, the manager and worker modules may be set one-to-one, and share the same observation.

In some embodiments, multiple workers may learn to collaborate under one manager while the managers also coordinate with each other. The manager may take joint observations of all the workers under it, and each worker may produce an action based on a specific observation and a shared goal. The scale of the multi-agent environment may be extended and communication may be facilitated through an attention mechanism, which may calculate influences of intersections and differentiate the impact to each agent. The performance of ride-sharing platforms may be improved through the use of multi-agent hierarchical reinforcement learning.

FIG. 1 illustrates an exemplary system 100 for joint ride-order dispatching and fleet management, in accordance with various embodiments. The exemplary system 100 may include a computing system 102, a computing device 104, and a computing device 106. It is to be understood that although two computing devices are shown in FIG. 1, any number of computing devices may be included in the system 100. Computing system 102 may be implemented in one or more networks (e.g., enterprise networks), one or more endpoints, one or more servers, or one or more clouds. A server may include hardware or software which manages access to a centralized resource or service in a network. A cloud may include a cluster of servers and other devices which are distributed across a network.

The computing devices 104 and 106 may be implemented on or as various devices such as a mobile phone, tablet, server, desktop computer, laptop computer, vehicle (e.g., car, truck, boat, train, autonomous vehicle, electric scooter, electric bike), etc. The computing system 102 may communicate with the computing devices 104 and 106, and other computing devices. Computing devices 104 and 106 may communicate with each other through computing system 102, and may communicate with each other directly. Communication between devices may occur over the internet, through a local network (e.g., LAN), or through direct communication (e.g., BLUETOOTH™, radio frequency, infrared).

In some embodiments, the system 100 may include a ride-hailing platform. The ride-hailing platform may facilitate transportation service by connecting drivers of vehicles with passengers. The platform may accept requests for transportation from passengers, identify idle vehicles to fulfill the requests, arrange for pick-ups, and process transactions. For example, passenger 140 may use the computing device 104 to order a trip. The trip order may be included in communications 122. The computing device 104 may be installed with a software application, a web application, an API, or another suitable interface associated with the ride-hailing platform.

The computing system 102 may receive the request and reply with price quote data for one or more trips. The price quote data for one or more trips may be included in communications 122. When the passenger 140 selects a trip, the computing system 102 may relay trip information to various drivers of idle vehicles. The trip information may be included in communications 124. For example, the request may be posted to computing device 106 carried by the driver of vehicle 150, as well as other commuting devices carried by other drivers. The driver of vehicle 150 may accept the posted transportation request. The acceptance may be sent to computing system 102 and may be included in communications 124. The computing system 102 may send match data to the passenger 140 through computing device 104. The match data may be included in communications 122. The match data may also be sent to the driver of vehicle 150 through computing device 106 and may be included in communications 124. The match data may include pick-up location information, fees, passenger information, driver information, and vehicle information. The matched vehicle may then be dispatched to the requesting passenger. The fees may include transportation fees and may be transacted among the system 102, the computing device 104, and the computing device 106. The fees may be included in communications 122 and 124. The communications 122 and 124 may additionally include observations of the status of the ride-hailing platform. For example, the observations may be included in the initial status of the ride-hailing platform obtained by information component 112 and described in more detail below. The communication 124 may additionally include instructions for the driver of the vehicle 150 to reposition to a different division or remain in the current division.

While the computing system 102 is shown in FIG. 1 as a single entity, this is merely for ease of reference and is not meant to be limiting. One or more components or one or more functionalities of the computing system 102 described herein may be implemented in a single computing device or multiple computing devices. The computing system 102 may include an information obtaining component 112, a HRL model component 114, and a pricing action component 116. The computing system 102 may include other components. The computing system 102 may include one or more processors (e.g., a digital processor, an analog processor, a digital circuit designed to process information, a central processing unit, a graphics processing unit, a microcontroller or microprocessor, an analog circuit designed to process information, a state machine, and/or other mechanisms for electronically processing information) and one or more memories (e.g., permanent memory, temporary memory, non-transitory computer-readable storage medium). The one or more memories may be configured with instructions executable by the one or more processors. The processor(s) may be configured to perform various operations by interpreting machine-readable instructions stored in the memory. The computing system 102 may be installed with appropriate software (e.g., platform program, etc.) and/or hardware (e.g., wires, wireless connections, etc.) to access other devices of the system 100.

In some embodiments, the one or more memories of computing system 102 may store a trained HRL model. Functionalities of the trained HRL model may be executable by the one or more processors of computing system 102. For example, the trained HRL be stored in association the HRL model component 114. The trained HRL model may include manager modules, and the manager modules may include sets of worker modules. In some embodiments, the manager modules may include manager agents, and the worker modules may include worker agents. The manager modules, the worker modules, the manager agents, and the worker agents may be stored in the one or more memories of computing system 102, and may be executable by the one or more processors of computing system 102.

The information obtaining component 112 may be configured to obtain information. The obtained information may include a status of a ride-sharing platform and a set of messages. Obtaining information may include one or more of accessing, acquiring, analyzing, determining, examining, identifying, loading, locating, opening, receiving, retrieving, reviewing, storing, or otherwise obtaining the information. In some embodiments, the status of a ride-sharing platform may include observations $o_t \in O$ from manager agents and worker agents. Observations of manager agents and worker agents may differ at scale. Observations of each manager may include a joint observations of its workers. At each time step t, agent i may draw private observations $o_t^i \in O$ correlated with the environment state $s_t \in S$. In some embodiments, the status of a ride-sharing platform may include a number of available vehicles in a division corresponding to a worker module in a region corresponding to a manager module, a number of outstanding trip orders in the division, an entropy of the division, a number of vehicles in a fleet management group (e.g., vehicles not dispatched to ride orders), and a distribution of orders in the division (e.g. distribution of trip prices, distribution of trip durations). The status of a ride-sharing platform may be expressed as $S = <N_{vehicle}, N_{order}, E, N_{fm}, N_{order}>$.

In some embodiments, once order dispatching or fleet management occurs, the dispatched or fleeted items may slip out of the system. In some embodiments, idle vehicles and available orders may contribute to disorder and unevenness of the ride-sharing system (e.g., there may be more orders than idle vehicles in one division, and more idle vehicles than orders in another region). As a result, the concept of entropy may be extended, and defined as:

$$E = -k_B \times \sum_i \rho_i \log \rho_i := -k_B \times \rho_0 \log \rho_0 \tag{1}$$

where $k_B$ is the Boltzmann constant, and $\rho_i$ is the probability for each state (e.g., $\rho_1$ for dispatched and fleeted, $\rho_0$ elsewhere). In some embodiments, items at the first state may be ignored, resulting in the formula of $\rho_0$ as follows:

$$\rho_0 = \frac{N_{vehicle} \times N_{vehicle}}{N_{Vehicle} \times N_{order}} = \frac{N_{vehicle}}{N_{order}}, \tag{2}$$

with initial condition $N_{vehicle} < N_{order}$ (i.e., the number of vehicles is less than the number of orders). In some embodiments, the initial conduction may be transformed to other conditions.

In some embodiments, the set of messages obtained by information obtaining component 112 may include cooperating information $m_i^t$ for i-th communication. In some embodiments, the messages may include abstract data (e.g., characters, strings, integers, floating point numbers) which may be input into a neural network to achieve a desired result. The cooperating information $m_i^t$ may be generated from a recurrent neural network at t. In some embodiments, the set of messages may include a set of manager-level messages for coordinating between at least a first manager module and a second manager module of the at least one manager module, and a set of worker-level messages for communicating between the set of worker modules. A self-attention mechanism may be extended to learn to evaluate each available interaction as:

$$h_{ij} = (h_i W_T) \cdot (h_j W_S)^T, \quad (3)$$

where $h_i W_T$ may include an embedding of messages from a target grid, and $h_j W_S$ may include an embedding of messages from a source grid. The evaluation $h_{ij}$ may be modeled as the value of a communication between an i-th grid and a j-th grid. In order to retrieve a general attention value between source and target grids, the evaluation may further be normalized in neighborhood scope as:

$$\alpha_{ij} = \text{softmax}(h_{ij}) = \frac{e^{h_{ij}/\tau}}{\sum_{j \in N_i} e^{score_j/\tau}}, \quad (4)$$

where $N_i$ may include a neighborhood scope (i.e., a set of interactions available for the target grid). In order to jointly attend to the neighborhood from different representation subspaces at different grids, multi-head attention may be leveraged to extend the observation as:

$$m_i = \sigma \left( W_q \cdot \left( \frac{1}{H} \sum_{h=1}^{h=H} \sum_{j \in N_i} \alpha ij(h_i W_C) \right) + b_q \right), \quad (5)$$

where H may include the number of attention heads, and $W_T$, $W_S$, $W_C$ may include multiple sets of trainable parameters. For example, the set of messages may include attention input 414 described with respect to FIG. 4A below, and attention input 464 described with respect to FIG. 4B below.

The HRL model component 114 may be configured to input obtained information into a trained HRL model. The trained HRL model may include at least one manager module corresponding to a region, and the at least one manager module may include a set of worker modules each corresponding to a division in the region. The set of worker modules may include one or more worker modules. In some embodiments, each division corresponding to a worker module may correspond to a grid cell in a grid-world representing a real world geographical area. As a result, each region corresponding to a manager module may include a group of grids. For example, the at least one manager module may include a group of seven neighboring grids. The grid-world representing a real world geographical area may include the hexagonal grid world illustrated in FIG. 2A.

FIG. 2A illustrates exemplary diagram 200 of hexagonal grid world 202, in accordance with various embodiments. Grid world 202 may be used to represent a region (e.g., city, county, district, state, country). In some embodiments, orders within a pick-up distance may be dispatched to vehicles. The distance between grids may be set on based on the pick-up distance. Vehicles in the same spatial-temporal node may be homogeneous (i.e., vehicles located in the same grid may share the same characteristics). As a result, order dispatching may be modeled as a large-scale parallel ranking problem, wherein orders may be ranked and matched with homogeneous vehicles in each grid. Fleet control for FM, (i.e. repositioning vehicles to neighbor grids or staying at the current grid) may be treated as fake orders and included in the same ranking procedure as order dispatching. Joint OD and FM may be modeled as a Markov game $\mathcal{G}$ for N agents. The game $\mathcal{G}$ may be defined by a tuple $\mathcal{G} = (N, S, A, P, R, \gamma)$, where S, A, P, R, $\gamma$ are the number of agents, a state space, an action space, a station transition probability, a reward function, and a future reward discount factor, respectively.

In some embodiments, available grids may be considered as agents identified by $i \in I := 1, \ldots, N$. Each single grid may have an associated worker module and manager module. A group of multiple grids may be associated with the same manager module. The grid world 202 may include managers 212 and 214. The manager 212 may include workers 220-226, and manager 214 may include workers 231 and 232. The grid world 202 may include additional managers and workers, and managers 212 and 214 may include additional workers. In some embodiments, workers 220-232 may correspond to worker modules and managers 212 and 214 may correspond to manager modules. In some embodiments, workers 220-232 may correspond to worker agents and managers 212 and 214 may correspond to manager agents. Although the number of vehicles and orders may vary over time, the number of agents (i.e. grids) may be fixed.

Returning to FIG. 1, the HRL model component 114 may further be configured to obtain at least one goal of the division in the region based on the status of the ride-sharing platform and the set of messages. For example, manager modules may include manager agents, and worker modules may include worker agents in a HRL setting. The actions of the manager agents may include generating abstract and intrinsic goals for its worker agents. The goals may include values to encourage worker agents to perform certain actions. For example, the goals may encourage worker agents to reposition vehicles from a division with high supply (i.e., idle vehicles) and low demand (i.e., a low number of orders) to a division with low supply and high demand. In some embodiments, a ranked list of real OD ride orders and fake FM ride orders may be obtained from each worker agent based on the status of the ride-sharing platform, the set of messages, and the at least one goal. The actions of the worker agents in the HRL may include generating a weight vector for a set of ranking features. The actions of the worker agents may be changed by changing the weight vector for the ranking features. At each timestep, the whole multi-agent system may produce a joint action $\alpha_t \in A_1 \times \ldots \times A_N$ for each manager agent and worker agent, which may induce a transition in the environment according to the state transition $P(s_{t+1}|s_t, \alpha_t)$. The state transition may determine state $s_{t+1}$ based on state $s_t$ and action $\alpha_t$. The state transition may include a neural network. In some embodiments, only the manager modules may receive feedback from interacting with the environment. An extrinsic reward function may determine the direction of optimization and may be proportional to both immediate profit and potential value. An intrinsic reward may be set to encourage the worker modules to follow the instructions from the manager modules.

The pricing action component 116 may be configured to generate a vehicle action for each vehicle in the division in the region based on the status of the ride-sharing platform, the set of messages, and the at least one goal. In some embodiments, the vehicle action may include OD or FM. In some embodiments, the OD may include adding the each vehicle into an OD group, and dispatching a corresponding vehicle to a passenger in the ride-sharing platform. In some embodiments, the FM may include adding the each vehicles into an FM group, and repositioning a corresponding vehicle to a different division or keeping the corresponding vehicle at the division. In some embodiments, the worker module for a gird cell may generate vehicle actions for the vehicles in the grid cell. In some embodiments, generating the vehicle action for each vehicle may include obtaining a set of feature weights for each worker module in set of worker modules. The set of feature weights may be obtained based on the status of the ride-sharing platform, the set of messages, and the at least one goal. A set of ranking features may be obtained for a set of trip orders. A ranked list of candidate OD orders and candidate FM orders may be obtained based on the set of feature weights and the set of ranking features. A top vehicle action may be selected from the ranked list for each vehicle. An example of vehicle actions taken by a worker agent is illustrated in FIG. 2B.

Figure 2B:
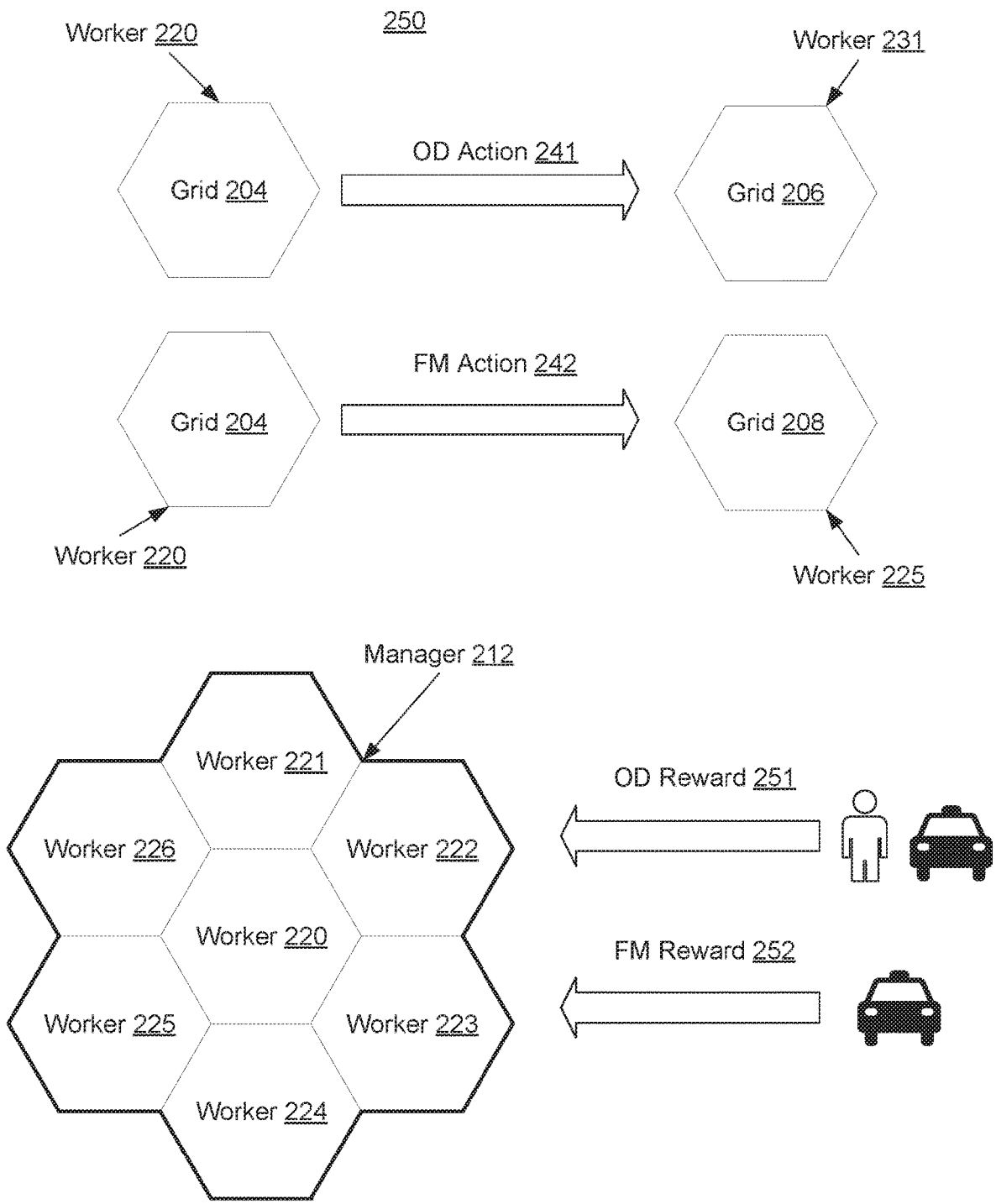
FIG. 2B illustrates exemplary diagram of actions and rewards in a grid world, in accordance with various embodiments.

FIG. 2B illustrates exemplary diagram 250 of actions and rewards in a grid world, in accordance with various embodiments. At time t=0, the worker 220 may rank available real OD orders and potential fake FM, and selected the top two options. For example, the top two actions may include OD action 241 and FM action 242. OD action 241 may include a real order from grid 204 associated with worker 220 to grid 206 associated with worker 231. For example, a vehicle may be dispatched to pick up a passenger in grid 204 with a ride destination in grid 206. FM action 242 may include a fake order from grid 204 associated with worker 220 to grid 208 associated with worker 225. As previously described with reference to FIG. 2A, the manager 212 may include workers 220-226. If a driver finishes OD action 241 generated by worker 220, the manager 212 of worker 220 may receive OD reward 251. If a driver finishes FM action 242 generated by worker 220, the manager 212 of worker 220 may receive FM reward 252.

Figure 3:
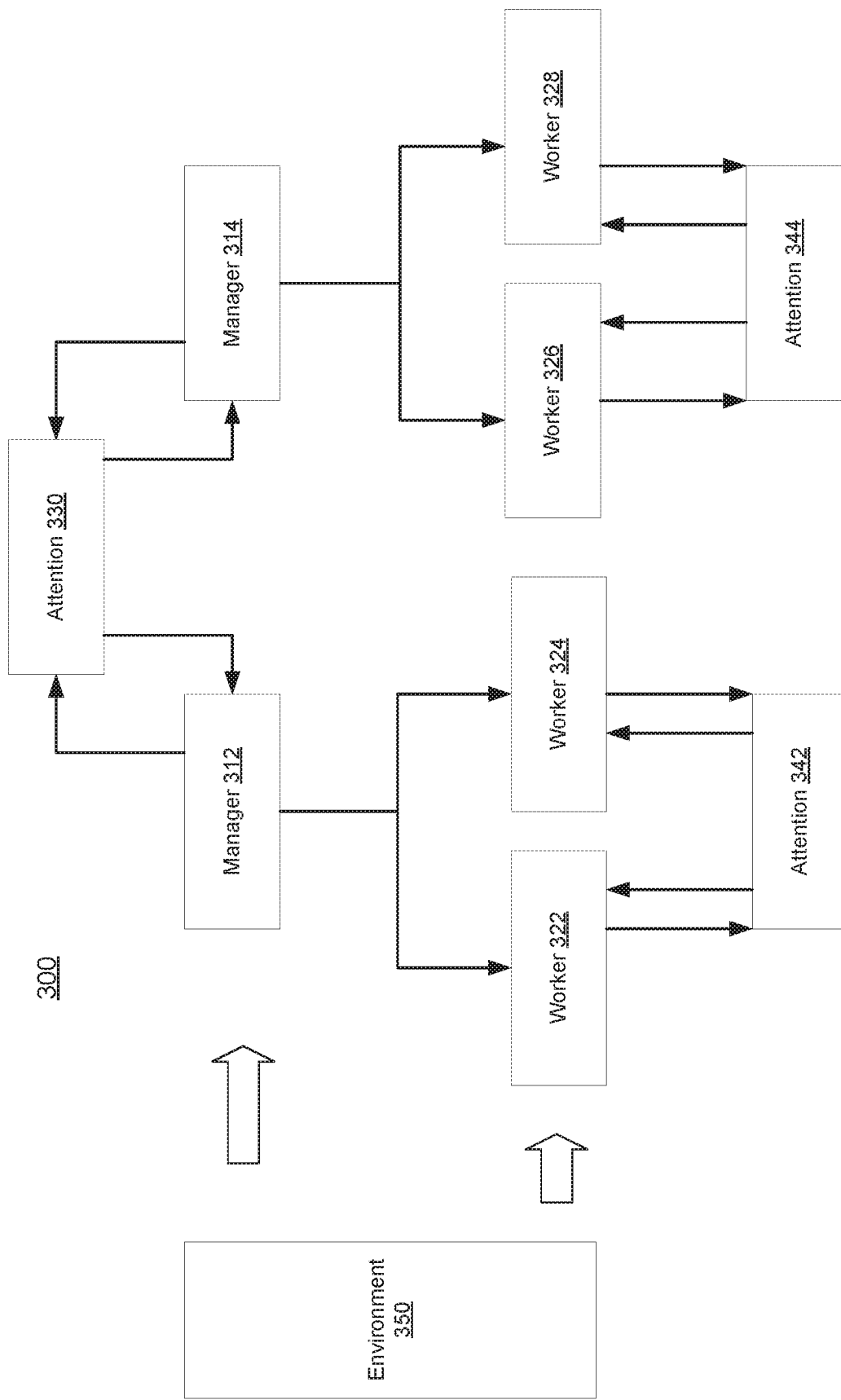
FIG. 3 illustrates an exemplary block diagram for joint ride-order dispatching and fleet management, in accordance with various embodiments.

FIG. 3 illustrates an exemplary block diagram 300 for joint ride-order dispatching and fleet management, in accordance with various embodiments. The example block diagram 300 may include a hierarchical architecture including two layers of modules. The hierarchical architecture may include a first layer of manager modules and second layer of worker modules. In some embodiments, the manager modules may include manager agents, and the worker modules may include worker agents. Each module may be associated with a communication component for exchanging messages. The first layer of manager modules may include managers 312 and 314. The second layer of worker modules may include workers 322, 324, 326, and 328. Each manager may be assigned with multiple workers, and the system may learn to collaborate the two layers of modules. For example, workers 322 and 324 may be assigned to manager 312, and workers 326 and 328 may be assigned to manager 314.

In some embodiment, the manager modules may obtain manager-level messages $m_{t-1}^M$ for a pervious timestep t−1 from manager-level attention 330 and manager-level observations $o_t^M$ for a current timestep t from environment 350. The attentions 330, 342, and 344 may include the attention mechanisms described with reference to information obtaining component 112 of FIG. 1 above. The environment 350 may include the real world region. The manager modules may generate goal vectors $g_t$ and latent state representations $h_t^M$ based on the manager-level messages and observations. The latent state representations may be input into the manager-level attention 330, and the goal vectors may be provided to the worker modules. The workers 322 and 324 may obtain worker-level peer messages $m_{t-1}^W$ from worker-level attention 342. The workers 326 and 328 may obtain worker-level messages $m_{t-1}^W$ from worker-level attention 344. Workers 322, 324, 326, and 328 may obtain private worker-level observations $o_t^W$ from environment 350. Private observations may include observations which the workers do not share with other workers or with their manager. The worker modules may generate actions and inputs $h_t^W$ for worker-level attentions 342 and 344 based on the private worker-level observations $o_t^W$, the worker-level peer messages $m_{t-1}^W$, and the goal vectors $g_t$ from the manager module.

Figure 4A:
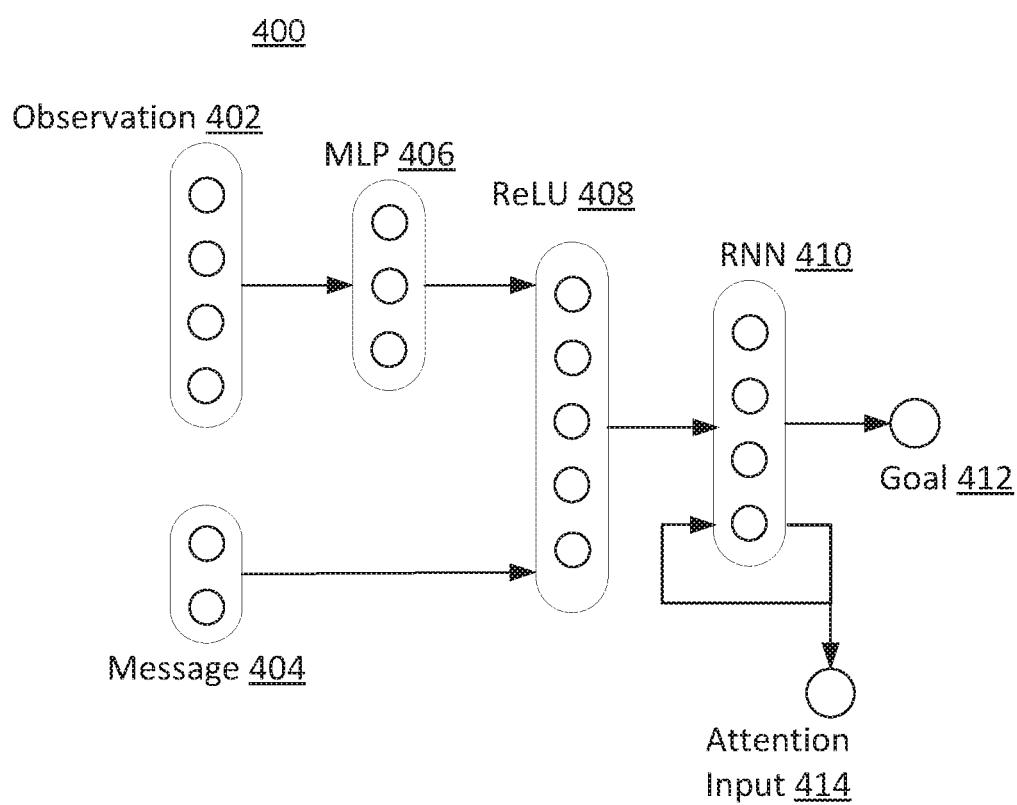
FIG. 4A illustrates an exemplary block diagram of a manager module, in accordance with various embodiments.

FIG. 4A illustrates an exemplary block diagram of a manager module 400, in accordance with various embodiments. The manager module 400 may receive observation 402 from the environment of the ride-sharing platform and message 404 from a manager-level attention. The observation 402 may include observation $o_t^M$ received by a manager agent at timestep t. The message 404 may include a manager-level message $m_{t-1}^M$ for the pervious timestep t−1. The observation 402 may be fed into multilayer perceptron (MLP) 406. The output of the MLP 406 and the message 404 may be fed into rectified linear unit (ReLU) 408. The output of the ReLU 408 may be fed into dilated recurrent neural network (RNN) 410. The RNN 410 may generate as outputs goal 412 and attention input 414. The goal 412 may include goal $g_t$ output at timestep t. Attention input 414 may include a latent state representations $h_t^M$ and may be an input for a manager-level attention. Attention input 414 may be fed back into RNN 410.

In some embodiments, the at least one manager module may receive an extrinsic reward in response to vehicle actions based on an ADI and an ORR. For example, the extrinsic reward may be received by the hardware of computing system 102. The environment may respond with a new observation $o_{t+1}^M$ for the next timestep t+1 and a scalar reward $r_t$. The goal of the module may include maximizing the discounted return $R_t = \Sigma_{k=0}^\infty \gamma^k r_{t+k+1}^M$ with $\gamma \in [0,1]$. In the ride-sharing setting, a global reward may be designed by taking ADI and ORR into account, which may be formulated as:

$$r_t^M = r_{ADI} + r_{ORR}, \quad (6)$$

wherein the reward $r_{ADI}$ represents ADI. The reward $r_{ADI}$ may be computed according to a price of each served order. The reward $r_{ORR}$ may encourage ORR, and may be calculated with the following formula:

$$r_{ORR} = \sum_{grids} (E - \bar{E})^2 + \sum_{areas} D_{KL}(P_t^o \| P_t^v) \quad (7)$$

wherein E is the entropy of the manager module, and $\bar{E}$ is the global average entropy. The first part of equation (7) may sum the difference in entropy in all the grids in order to optimize ORR on a global level. $P_t^v$ and $P_t^o$ may denote the vehicle and order distributions of an area at timestep t. Areas may be different than grids, and may include certain districts which need to be taken more care of (e.g. a subway station). The distributions may include Poisson distributions which are commonly used for vehicle routing and arrivals. Kullback-Leibler (KL) divergence optimization may be used to align the vehicle and order distributions in each area. The second part of equation (7) may sum the divergence of all the areas. A combined ORR reward design may help optimization both globally and locally.

Figure 4B:
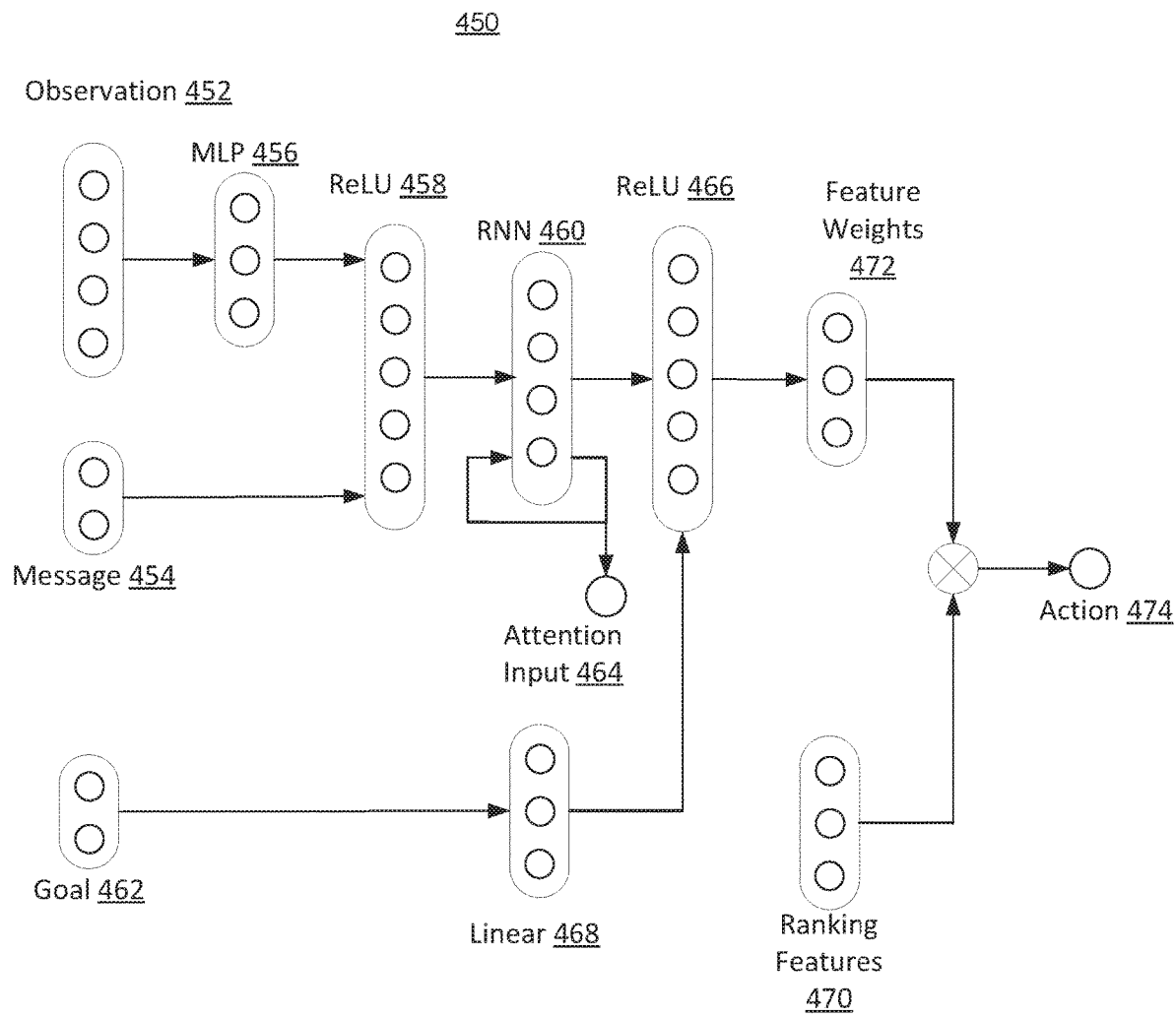
FIG. 4B illustrates an exemplary block diagram of a worker module, in accordance with various embodiments.

FIG. 4B illustrates an exemplary block diagram of a worker module 450, in accordance with various embodiments. The worker module 450 may receive observation 452 from the environment of the ride-sharing platform, message 454 from a worker-level attention, goal 462 from a manager module, and ranking features 470. The observation 452 may include observation $o_t^W$ received by a worker agent at timestep t. The message 454 may include a worker-level message $m_{t-1}^W$ for the pervious timestep t−1. The goal may include goal $g_t$. The ranking features 470 may include a ranking feature $e_i$ for each order i.

The observation 452 may be fed into MLP 456. The output of the MLP 456 and the message 454 may be fed into ReLU 458. The output of the ReLU 458 may be fed into RNN 460. The RNN 460 may generate two outputs: an input for ReLU 466 and attention input 464. Attention input 464 may include a latent state representations $h_t^W$ and may be an input for a worker-level attention. Attention input 464 may be fed back into RNN 460. The goal 462 may be input into linear neural network 468. ReLU 466 may receive the output from RNN 460 and the output from linear 468. ReLU 466 may generate feature weights 472. The feature weights 472 may include potential actions for vehicles in a grid cell associated with worker module 450.

In some embodiments, each worker module in the set of worker modules may receive an intrinsic reward in response to vehicle actions based on a cosine similarity between the at least one goal and a change in the status of the ride-sharing platform over time. For example, the intrinsic reward may be received by the hardware of computing system 102. In some embodiments, Feudal Networks (FuN) goal embedding may be used for worker modules. An intrinsic reward may be used to encourage the worker modules to follow the goals. The reward may be defined as:

$$r_t^I = \frac{1}{c}\sum_{i=1}^{c} d_{cos}(o_t^W - o_{t-1}^W, g_{t-i}) \qquad (8)$$

where $d_{cos}(\alpha,\beta)=\alpha^T\beta/(|\alpha|\cdot|\beta|)$ is the cosine similarity between two vectors. Unlike traditional FuN, the worker module 450 procedure may produce actions consists of two steps: 1) parameter generation, and 2) action generation. A state-specific scoring function $f_\theta w$ may be utilized in parameter generation to map the current state $o_t^W$ to a list of weight vectors $\omega_t$ as:

$$f_\theta w : o_t^W \to \omega_t \qquad (9)$$

Action 474 may be generated based on the feature weights 472 and ranking features 470. Action 474 may include order dispatching and fleet management actions. Generating action 474 may include extending linear relations with non-linear relations. The scoring function parameter $\omega_t$ and the ranking feature $e_i$ for order i may be formulated as $$\text{score}_i = \omega_t^T e_i \qquad (10)$$

In some embodiments, real orders in $o_t^W$ and fleet control orders (i.e., fake orders to reposition vehicles to neighbor grids or to stay at the current grid) may be built and added into item space I. In some embodiments, after all available options in I are calculated, the options may be ranked. The Top-k items may be selected for order dispatching and fleet management. In some embodiments, a Boltzmann softmax selector may be used to generate Selected-k items:=$e^{score_i/T}/\sum_{i=1}^{M}e^{score_i/T}$, where k=min($N_{vehicle}$, $N_{order}$) and T denotes a temperature hyperparameter to control the exploration rate, and M is the number of scored order candidates. This approach not only equips the action selection procedure with controllable exploration, but also diversifies the policy's decision to avoid choosing groups of drivers fleeted to the same grid.

In some embodiments, the best joint OD and FM actions may be selected for each worker module. Current manager-level and worker-level observations $o_t^M$ and $o_t^W$ may be obtained for the current timestep t. Mutual manager-level and worker-level communication messages $m_{t-1}^M$ and $m_{t-1}^W$ may be obtained for the previous timestep t-1. Each manager module may generate a goal $g_t$ for the current timestep t. Each worker module may generate weight vectors $\omega_t$ according to equation (9). Real ride orders and fleet control items may be added to the item space I, and the items in the item space I may be ranked according to equation (10). Action 474 may include a selection of the top k items for each worker agent.

In some embodiments, manager module may generate specific goals based on their observations and peer messages. The worker modules under each manager modules may generate weight vectors according to private observations and sharing goals. A general item space I may be built for order dispatching and fleet management, and the items in I may be ranked. A final action may be selected from the top-k scored items based on a minimum of the number of vehicles and orders. The learning approach from FuN and HRL may be extended to train the manager and worker agents included in the manager and worker modules. For example, HRL may include hierarchical reinforcement learning with off-policy correction (e.g., HIRO). Off-policy learning may include learning an optimal policy independently from the actions of agents. In the HRL setting, off-policy correction may be used to associate past observations and rewards with the goals generated by manager agents. Manager agents may then be trained based on the associations.

In some embodiments, a deep deterministic policy gradients (DDPG) algorithm may be utilized to train the parameters for both the manager agents and the worker agents. DDPG may include an Actor and a Critic. The Actor may perform actions, and the Critic may direct the Actor in updating its parameters. The Critic may be designed to leverage an approximator and to learn an action-value function $Q(o_t,a_t)$. An optimal action-value function $Q^*(o_t,a_t)$ may follow the Bellman equation as:

$$Q^*(o_t,a_t) = \mathbb{E}_{o_{t+1}}\left[r_t + \gamma\max_{a_{t+1}}Q^*(o_{t+1}, a_{t+1}) \,\Big|\, o_t, a_t\right] \qquad (11)$$

Equation (11) may require |A| evaluations to select the optimal action. As a result, it may be difficult of adopt equation (11) in real-world scenarios (e.g. a ride-sharing setting with enormous state and action spaces).

In some embodiments, the Actor architecture may generate a deterministic action for the Critic. For example, the worker agent may select a set of top actions. In some embodiments, an approximator function may estimate the action-value function as $Q(o,a)\approx Q(o,a;\theta^\mu)$. A deep Q-network (DQN) may be used to estimate the action-value function. For example, a neural network function approximator may be trained by minimizing a sequence of loss functions $L(\theta^\mu)$ as:

$$L(\theta^\mu) = \mathbb{E}_{s_t,a_t,r_t,o_{t+1}}[(y_t - Q(o,a;\theta^\mu))^2] \qquad (12)$$

where $y_t = \mathbb{E}_{o_{t+1}}[r_t + \gamma Q'(o_{t+1},a_{t+1};\theta^\mu)|o_t, a_t]$ may be the target for the current iteration. As a result, an optimal action may be approximated.

In some embodiments, a dynamic simulation environment may be used for training and evaluation to account for the trial-and-error nature of reinforcement learning. A grid-based simulator may be extended to joint order dispatching and fleet management. In some embodiments, twenty episodes may be run for each learning method. Each episode may include training, storing the trained model periodically, and conducting the evaluation on the stored model with five random seeds. Joint order dispatching and fleet management tasks may be simulated. ADI and ORR may first be evaluated in a single order dispatching environment. Then, ADI and ORR may be evaluated in a joint setting and compare with its performance in single setting in case study.

Higher growths in terms of ADI may be achieved not only by considering every feature of each order concurrently, but also through learning to collaborate grid-wisely. The models may learn to collaborate between agents among mean field. Grids may convey more information and may be easier to learn because grids are stationary while drivers are relatively dynamic. Each grid may be represented as an agent, and may exchange messages and learn to cooperate grid-wisely through a graphical attention network.

Visualization analysis may be used to analyze whether the learned graphical attention network is able to capture the demand-supply relation. As shown in FIG. 3, the communication mechanism may be conducted in a hierarchical way. Attention among the managers may communicate and learn to collaborate abstractly and globally while peer workers may operate and determine attention for a local grid. Grids with more orders or higher attention value may be shown in red (in green if opposite) and the gap may be proportional to the shade of colors. As a result, the value function may estimate the relative shift of demand-supply gap from both global and local perspectives.

Figure 5B:
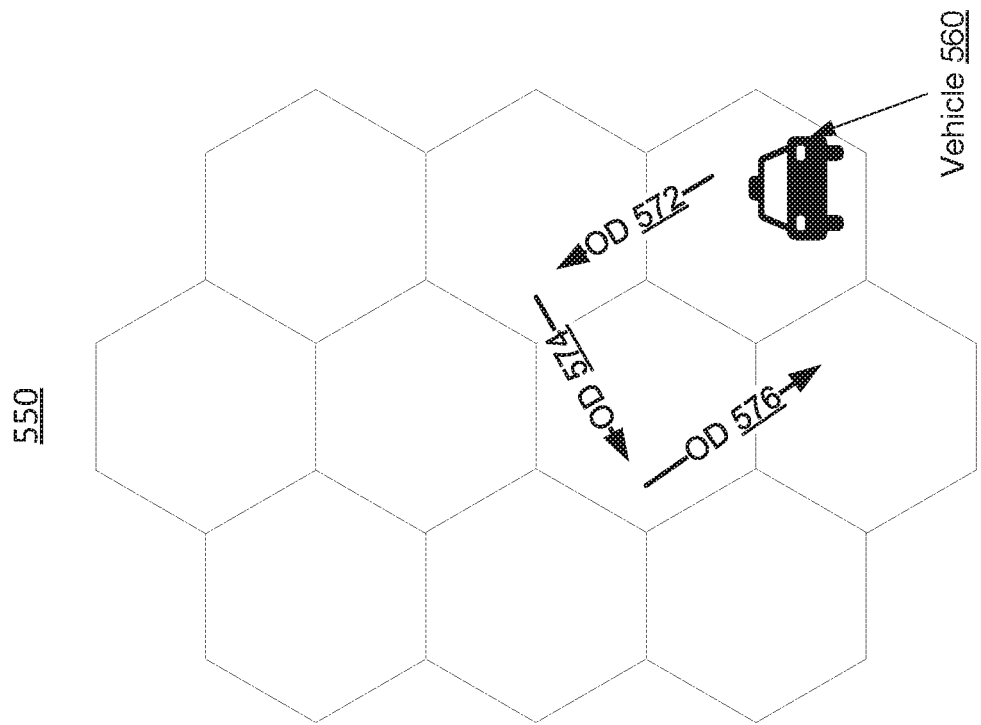
FIG. 5B illustrates exemplary diagram of actions in a grid world without fleet management, in accordance with various embodiments.
Figure 5A:
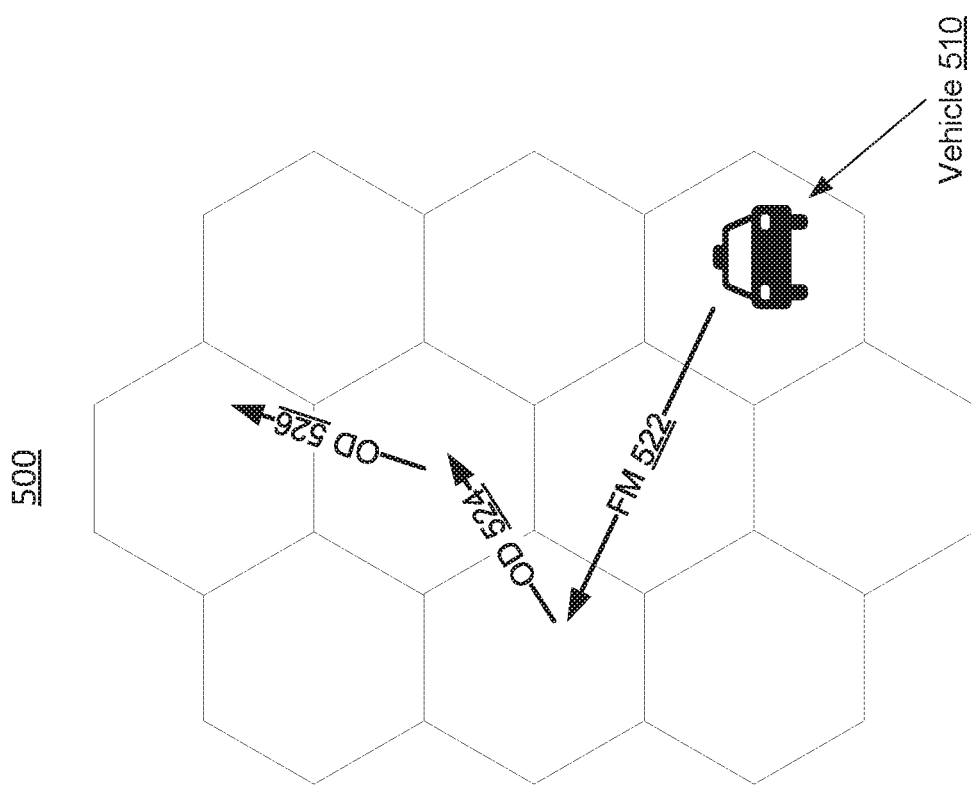
FIG. 5A illustrates exemplary diagram of FM and OD actions in a grid world, in accordance with various embodiments.

FIG. 5A illustrates exemplary diagram 500 of FM and OD actions in a grid world, in accordance with various embodiments. A synthetic data set may be constructed to simulate ride-sharing in peak hours, and may trace and analyze how a single driver is dispatched. During the peak hours, people located in downtown may return back to uptown. The downtown area may contain more and high-value orders. The uptown area may rank fleet control with real orders, and may select to reposition driver to the downtown area to pick up more orders. Vehicle 510 may first receive FM 522 to reposition to the downtown area. After the vehicle 510 has repositioned to the downtown area, the vehicle 510 may receive OD 524 and 526.

FIG. 5B illustrates exemplary diagram 550 of actions in a grid world without fleet management, in accordance with various embodiments. Vehicle 560 may receive OD 572, 574, and 576. Without fleet management, drivers may be allocated by order, the drivers may stay in the uptown areas and be dispatched with less and low-value orders. Joint order dispatching and fleet management may improve the experience for both drivers and passengers by benefiting ADI and ORR respectively, and may also alleviate traffic congestion and promote transportation efficiency.

FIG. 6 illustrates a flowchart of an exemplary method 600 for joint ride-order dispatching and fleet management, according to various embodiments of the present disclosure. The method 600 may be implemented in various environments including, for example, the system 100 of FIG. 1. The operations of the method 600 presented below are intended to be illustrative. Depending on the implementation, the method 600 may include additional, fewer, or alternative steps performed in various orders or in parallel. The method 600 may be implemented in various computing systems or devices including one or more processors.

With respect to the method 600, at block 602, information may be obtained. The information may include a status of a ride-sharing platform and a set of messages. At block 604, the obtained information may be input into a trained hierarchical reinforcement learning (HRL) model. The trained HRL model may include at least one manager module corresponding to a region, and the at least one manager module may include a set of worker modules each corresponding to a division the region. At block 606, at least one goal of the division in the region may be obtained based on the status of the ride-sharing platform and the set of messages. At block 608, a set of vehicle actions may be generated for each vehicle in the division in the region based on the status of the ride-sharing platform, the set of messages, and the at least one goal.

Figure 7:
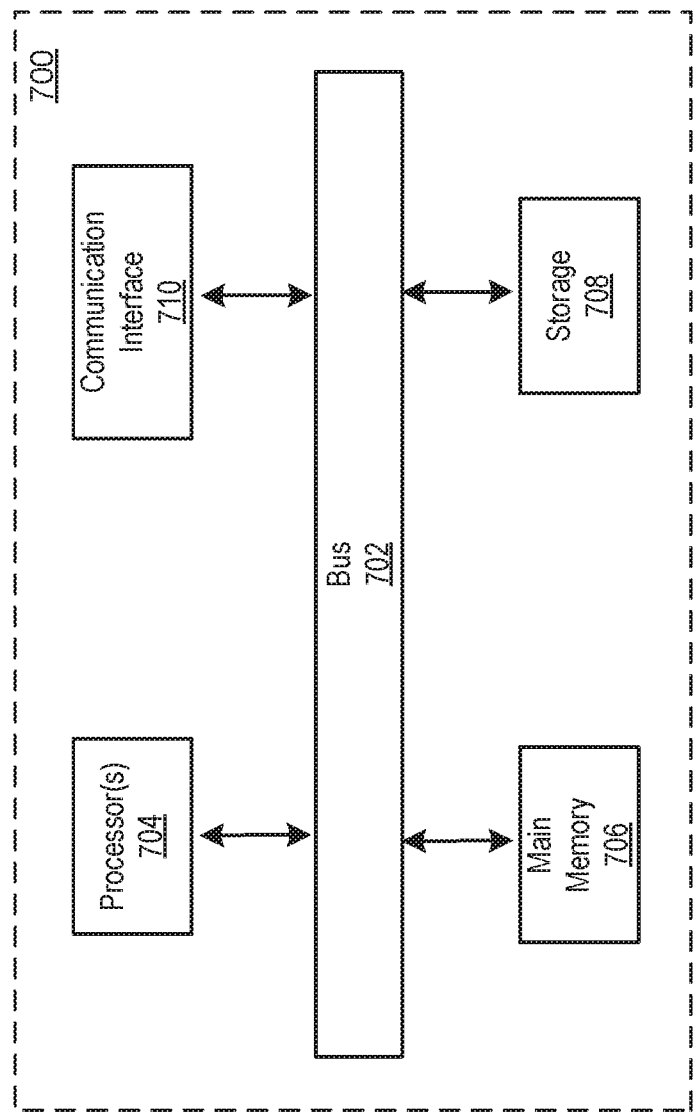
FIG. 7 is a block diagram that illustrates a computer system upon which any of the embodiments described herein may be implemented.

FIG. 7 is a block diagram that illustrates a computer system 700 upon which any of the embodiments described herein may be implemented. For example, the computing system 700 may be used to implement the computing system 102 shown in FIG. 1. As another example, the processes/methods shown in FIGS. 2-6 and described in connection with this figure may be implemented by computer program instructions stored in main memory 706. When these instructions are executed by processor(s) 704, they may perform the steps as shown in FIGS. 2-6 and described above. In some embodiments, hard-wired circuitry may be used in place of or in combination with software instructions. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor(s) 704. Main memory 706 also may be used for storing temporary variables or other intermediate information during execution of instructions to be executed by processor(s) 704. Such instructions, when stored in storage media accessible to processor(s) 704, render computer system 700 into a special-purpose machine that is customized to perform the operations specified in the instructions. Main memory 706 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 708. Execution of the sequences of instructions contained in main memory 706 causes processor(s) 704 to perform the process steps described herein.

The computer system 700 also includes a communication interface 710 coupled to bus 702. Communication interface 710 provides a two-way data communication coupling to one or more network links that are connected to one or more networks. As another example, communication interface 710 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner). As used herein, for convenience, components of the computing system 102 may be described as performing or configured for performing an operation, when the components may comprise instructions which may program or configure the computing system 102 to perform the operation.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A computer-implemented method for joint ride-order dispatching and fleet management, comprising:
    obtaining information comprising a status of a ride-sharing platform and a set of messages;
    inputting the obtained information into a trained hierarchical reinforcement learning (HRL) model, wherein the trained HRL model comprises at least one manager module corresponding to a region, and wherein the at least one manager module comprises a set of worker modules each corresponding to a division in the region;
    obtaining at least one goal of the division in the region based on the status of the ride-sharing platform and the set of messages; and
    for each vehicle in the division in the region, generating a vehicle action based on the status of the ride-sharing platform, the set of messages, and the at least one goal,
    wherein the at least one manager module is configured to receive an extrinsic reward in response to the vehicle action based on an accumulated driver income and an order response rate.

2. The method of claim 1, wherein the status of the ride-sharing platform comprises: a number of available vehicles in the division, a number of trip orders in the division, an entropy of the division, a number of vehicles in a fleet management group, and a distribution of orders in the division.

3. The method of claim 1, wherein the set of messages comprises: a set of manager-level messages for coordinating between at least a first manager module and a second manager module of the at least one manager module, and a set of worker-level messages for communicating between the set of worker modules.

4. The method of claim 1, wherein each worker module in the set of worker modules corresponds to a grid cell in a grid-world representing a real world geographical area.

5. The method of claim 1, wherein the vehicle action comprises: order dispatching (OD) or fleet management (FM).

6. The method of claim 5, wherein the OD comprises dispatching a corresponding vehicle to a passenger in the ride-sharing platform.

7. The method of claim 5, wherein the FM comprises repositioning a corresponding vehicle to a different division or keeping the corresponding vehicle at the division.

8. The method of claim 5, wherein generating the vehicle action for each vehicle comprises:
    obtaining a set of feature weights based on the status of the ride-sharing platform, the set of messages, and the at least one goal;
    obtaining a set of ranking features for a set of trip orders;
    obtaining a ranked list of candidate OD ride orders and candidate FM ride orders based on the set of feature weights and the set of ranking features; and
    selecting for the each vehicle a top vehicle action from the ranked list.

9. The method of claim 1, wherein each worker module in the set of worker modules is configured to receive an intrinsic reward in response to the vehicle action based on a cosine similarity between the at least one goal and a change in the status of the ride-sharing platform over time.

10. A system for joint ride-order dispatching and fleet management, comprising one or more processors and one or more non-transitory computer-readable memories coupled to the one or more processors and configured with instructions executable by the one or more processors to cause the system to perform operations comprising:
    obtaining information comprising a status of a ride-sharing platform and a set of messages;
    inputting the obtained information into a trained hierarchical reinforcement learning (HRL) model, wherein the trained HRL model comprises at least one manager module corresponding to a region, and wherein the at least one manager module comprises a set of worker modules each corresponding to a division in the region;
    obtaining at least one goal of the division in the region based on the status of the ride-sharing platform and the set of messages; and
    for each vehicle in the division in the region, generating a vehicle action based on the status of the ride-sharing platform, the set of messages, and the at least one goal,
    wherein each worker module in the set of worker modules is configured to receive an intrinsic reward in response to the vehicle action based on the at least one goal and a change in the status of the ride-sharing platform over time.

11. The system of claim 10, wherein the set of messages comprises: a set of manager-level messages for coordinating between at least a first manager module and a second manager module of the at least one manager module, and a set of worker-level messages for communicating between the set of worker modules.

12. The system of claim 10, wherein the at least one manager module is configured to receive an extrinsic reward in response to the vehicle action based on an accumulated driver income and an order response rate.

13. The system of claim 10, wherein the vehicle action comprises: order dispatching (OD) or fleet management (FM).

14. The system of claim 10, wherein the OD comprises dispatching a corresponding vehicle to a passenger in the ride-sharing platform.

15. The system of claim 10, wherein the FM comprises repositioning a corresponding vehicle to a different division or keeping the corresponding vehicle at the division.

16. The system of claim 10, wherein generating the vehicle action for each vehicle comprises:
    obtaining a set of feature weights based on the status of the ride-sharing platform, the set of messages, and the at least one goal;
    obtaining a set of ranking features for a set of trip orders;
    obtaining a ranked list of candidate OD ride orders and candidate FM ride orders based on the set of feature weights and the set of ranking features; and
    selecting for the each vehicle a top vehicle action from the ranked list.

17. A non-transitory computer-readable storage medium configured with instructions executable by one or more processors to cause the one or more processors to perform operations comprising:
    obtaining information comprising a status of a ride-sharing platform and a set of messages;
    inputting the obtained information into a trained hierarchical reinforcement learning (HRL) model, wherein the trained HRL model comprises at least one manager module corresponding to a region, and wherein the at least one manager module comprises a set of worker modules each corresponding to a division in the region;
    obtaining at least one goal of the division in the region based on the status of the ride-sharing platform and the set of messages; and
    for each vehicle in the division in the region, generating a vehicle action based on the status of the ride-sharing platform, the set of messages, and the at least one goal, wherein the generating comprises:
    obtaining a set of feature weights based on the status of the ride-sharing platform, the set of messages, and the at least one goal;
    obtaining a set of ranking features for a set of trip orders;
    obtaining a ranked list of candidate ride orders for order dispatching and candidate ride orders for fleet management based on the set of feature weights and the set of ranking features; and
    selecting for the each vehicle a top vehicle action from the ranked list.

18. The non-transitory computer-readable storage medium of claim 17, wherein:
    the order dispatching comprises dispatching a corresponding vehicle to a passenger in the ride-sharing platform; and
    the fleet management comprises repositioning a corresponding vehicle to a different division or keeping the corresponding vehicle at the division.

* * * * *